United States Patent [19]

Mitchell

[11] Patent Number: 5,887,726

[45] Date of Patent: *Mar. 30, 1999

[54] COUPLING FOR CONNECTING FEED SPOUT TO SCREENING MACHINE

[75] Inventor: Stephen C. Mitchell, West Chester, Ohio

[73] Assignee: Rotex, Inc., Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 688,391

[22] Filed: Jul. 30, 1996

[51] Int. Cl.$^6$ ....................................................... B07B 1/00
[52] U.S. Cl. ........................................... 209/243; 209/247
[58] Field of Search ............................... 285/148.23, 244, 285/225, 9.2, 16; 141/71, 383; 209/240–244, 246, 247; 193/25 E

[56] References Cited

U.S. PATENT DOCUMENTS

| | | |
|---|---|---|
| 337,580 | 3/1886 | Hemphill . |
| 701,936 | 6/1902 | Roberts . |
| 943,891 | 12/1909 | Rathbun . |
| 1,873,590 | 8/1932 | James . |
| 1,923,124 | 8/1933 | Stanley . |
| 2,047,713 | 7/1936 | Simpson . |
| 2,297,700 | 10/1942 | Hinkle . |
| 2,419,750 | 4/1947 | Wiberg . |
| 3,346,917 | 10/1967 | Martin . |
| 3,669,471 | 6/1972 | Fetish . |
| 3,719,276 | 3/1973 | Allen et al. ............................... 209/240 |
| 4,059,293 | 11/1977 | Sipler ....................................... 285/236 |
| 4,251,354 | 2/1981 | Lower et al. . |
| 5,133,578 | 7/1992 | Whighsil et al. . |
| 5,259,511 | 11/1993 | Pierson et al. . |
| 5,354,104 | 10/1994 | Senes et al. . |

FOREIGN PATENT DOCUMENTS

| | | |
|---|---|---|
| 214205 | 3/1958 | Australia ............................... 209/243 |
| 0284296 | 9/1988 | European Pat. Off. . |
| 3-89978 | 4/1991 | Japan . |
| 191287 | 1/1967 | U.S.S.R. . |
| 432991 | 8/1935 | United Kingdom .................... 209/241 |

OTHER PUBLICATIONS

Chambers Science and Technology Dictionary, 1984, Edinburgh, p. 516.

*Primary Examiner*—Karen M. Young
*Assistant Examiner*—Thuy V. Tran
*Attorney, Agent, or Firm*—Wood, Herron & Evans, L.L.P.

[57] ABSTRACT

A coupling for directing a stream of particles falling from a feed spout through an opening on the top cover of the screen box of a screening machine. An upper diaphragm seals the feed spout within the mouth of a funnel. A lower diaphragm seals the funnel discharge opening within the top cover opening. Both diaphragms are flexible and permit the funnel to tilt axially and accommodate movement of the top cover opening with respect to the feed spout. Optionally, a gimble may support the funnel and diaphragms and thereby relieve the diaphragms from the weight of the coupling.

16 Claims, 5 Drawing Sheets

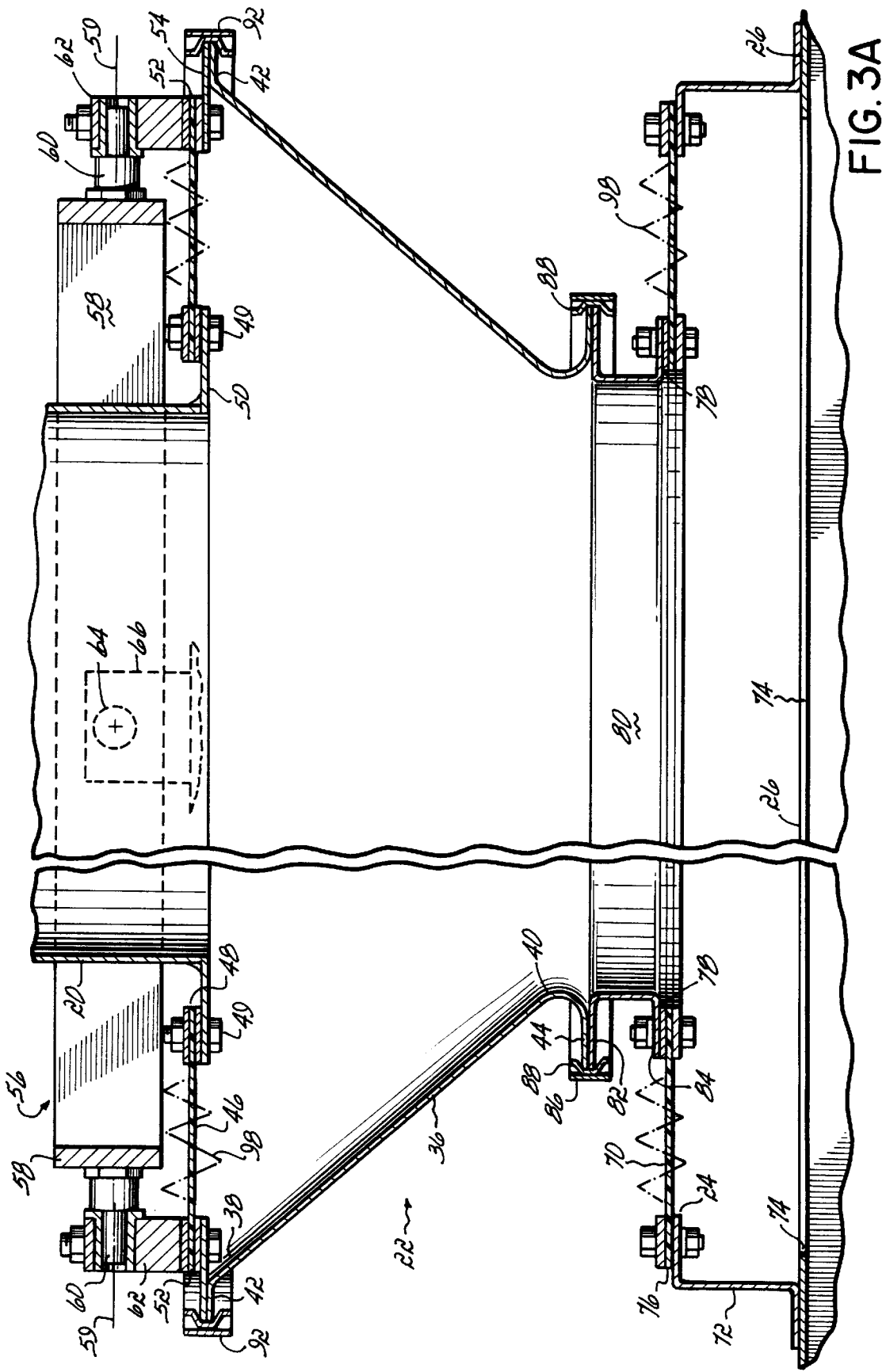

COUPLING FOR CONNECTING FEED SPOUT TO SCREENING MACHINE

FIELD OF THE INVENTION

This invention relates to screening machines and more particularly to a flexible, sealed coupling for conducting a stream of particles falling from a fixed feed spout into the moving screen box of a screening machine.

BACKGROUND

Screening machines, that is, machines having one or more screens for sizing, sifting or separating particulate material by vibratory, oscillatory, or gyratory screening movement, are in widespread commercial use. The screen or screens of such machines are mounted or housed within a movable enclosure called a "screen box." To prevent the escape of dust, the box typically has a top cover with an inlet opening. The material to be screened is usually fed from a source such as a hopper or elevator through a feed spout or inlet pipe, and falls through the inlet opening in the top cover, onto the top screen. The box and cover prevent the escape of dust and fines during operation and prevent the entrance of outside dirt which could contaminate the product being screened. One example of such a machine is the ROTEX® brand machine produced and sold by the assignee of this application.

In operation, screening movement applied to the box separates the different size or shape fractions of the particulate feed according to the size and shape of the screen openings. The various separated fractions are conducted from the screen box through one or more outlet conduits. Because the box (with the top cover on it) is moved in rapid screening motion, provision must be made for accommodating its motion relative to the stationary feed spout while at the same time enclosing the feed stream and airborne fines, and preventing the entrance of dirt. The same problem of accommodating relative motion arises when particles fall from a moving screen box into a fixed receiver pipe, and in other applications where one pipe moves or is disaligned with respect to another.

THE PRIOR ART

Hemphill U.S. Pat. No. 337,580 teaches axially deflectable, inwardly curving disks which are connected back-to-back to provide an expanding joint for tubes.

Simpson U.S. Pat. No. 2,047,713, teaches the use of a flexible corrugated rubber sleeve, connected between a feed spout and an opening into a screen box, to accommodate the relative motion of the screen box. The motion of the box subjects such sleeves to constant flexing, and they are abraded by the particles of the falling stream, as the result of which the sleeves tend to wear out more rapidly than is desirable.

Wiberg U.S. Pat. No. 2,419,750 shows pipes connected by a cylindrical sleeve having diaphragms inside its ends which are sealed around inlet and outlet pipe ends. Both diaphragms would be exposed to abrasion if a particle stream were carried.

Martin U.S. Pat. No. 3,246,917 shows a single diaphragm conduit seal. Stanley U.S. Pat. No. 1,923,124 shows the use of a single diaphragm between an inner sleeve and an inwardly slanting cone, together with springs to carry the weight of structure mounted below it.

Fetish U.S. Pat. No. 3,669,471 shows a two-diaphragm coupling with both diaphragms mounted inside a surrounding sleeve and outside the ends of spaced inlet and outlet pipes.

Lower U.S. Pat. No. 4,251,354 and Pearson U.S. Pat. No. 5,259,511 both disclose couplings for use with screening machines, wherein the couplings make sliding seals with the screen box. A sliding, sealing ring is supported by a diaphragm and the relative movement is accommodated as a sliding motion between the ring and a slide plate. Springs may be used to bias the ring into facial engagement with the plate.

THE PROBLEM IN THE ART

Particles falling on flexible coupling components can abrade them surprisingly rapidly, necessitating undesirably frequent replacement. Apart from abrasion by falling particles, wear of flexible components is caused by repeated flexing and especially by buckling of a flexible connector under the cyclical motion of the screen box with respect to the spout. Rigid coupling components can withstand abrasion but cannot, in the absence of a flexible connector, accommodate the relative motion of the screener with respect to the feed spout. The rate of degradation of flexible components is greatly increased if the component buckles (folds up on itself). It also increases with the abrasive nature of the incoming particle stream, its temperature and volume, fall distance, the amount of lateral offset of the spout from the box in operation, and the rate of machine operation.

Thus, there has been a continuing need in the screening machine industry for a flexible sealed coupling which is not exposed to wear from abrasion by particles falling through it, which can better withstand flexing from the movements of the screen box, and which can easily be removed for access to the screen or for replacement if necessary.

BRIEF DESCRIPTION OF THE INVENTION

In accordance with this invention an improved, flexible coupling is provided for use between a feed spout or other upstream pipe, and the enclosed screen box of a screening machine or other downstream pipe where there is relative motion between the two pipes. The coupling includes a funnel or cone having a mouth which is substantially wider than the feed spout, inlet or other upstream line, and a discharge end which is substantially narrower than the screen box (top cover) opening outlet, or other downstream line. Particles falling from the feed spout are directed by the funnel into the outlet opening. A first or upper flexible diaphragm has a central or other internal aperture which is mounted or mountable around the feed spout and extends outwardly around the spout, and an outer peripheral portion which is sealed over the funnel mouth outwardly of the feed spout. A second or lower flexible diaphragm, also having an internal central aperture, is mounted outwardly around the funnel discharge opening with its outer peripheral portion mounted around the periphery of the opening to the screen box. The flexibility and widths of the diaphragms are such that the funnel can tilt and move with little friction to accommodate the motion and/or non-alignment of the feed spout and the screen box inlet. Such tilting subjects the diaphragms to minimal buckling and tension in their respective planes; most of the force on motion of the diaphragms is in directions perpendicular to their planes, i.e., up and down. This greatly reduces diaphragm wear and permits long coupling life.

The funnel can hang from the diaphragms with the diaphragms carrying its weight; however, in a preferred embodiment a gimble is provided which supports the weight of the coupling, so that its weight is carried by a fixed support such as the feed spout or the screen box itself, rather than by the diaphragms.

DESCRIPTION OF THE DRAWINGS

The invention can best be further described by reference to the accompanying drawings, in which:

FIG. 3A is an enlarged axial section taken on line 3A—3A of FIG. 1, showing the coupling in axial alignment with respect to the feed spout and with the diaphragms undeflected;

DETAILED DESCRIPTION

Figure 1:
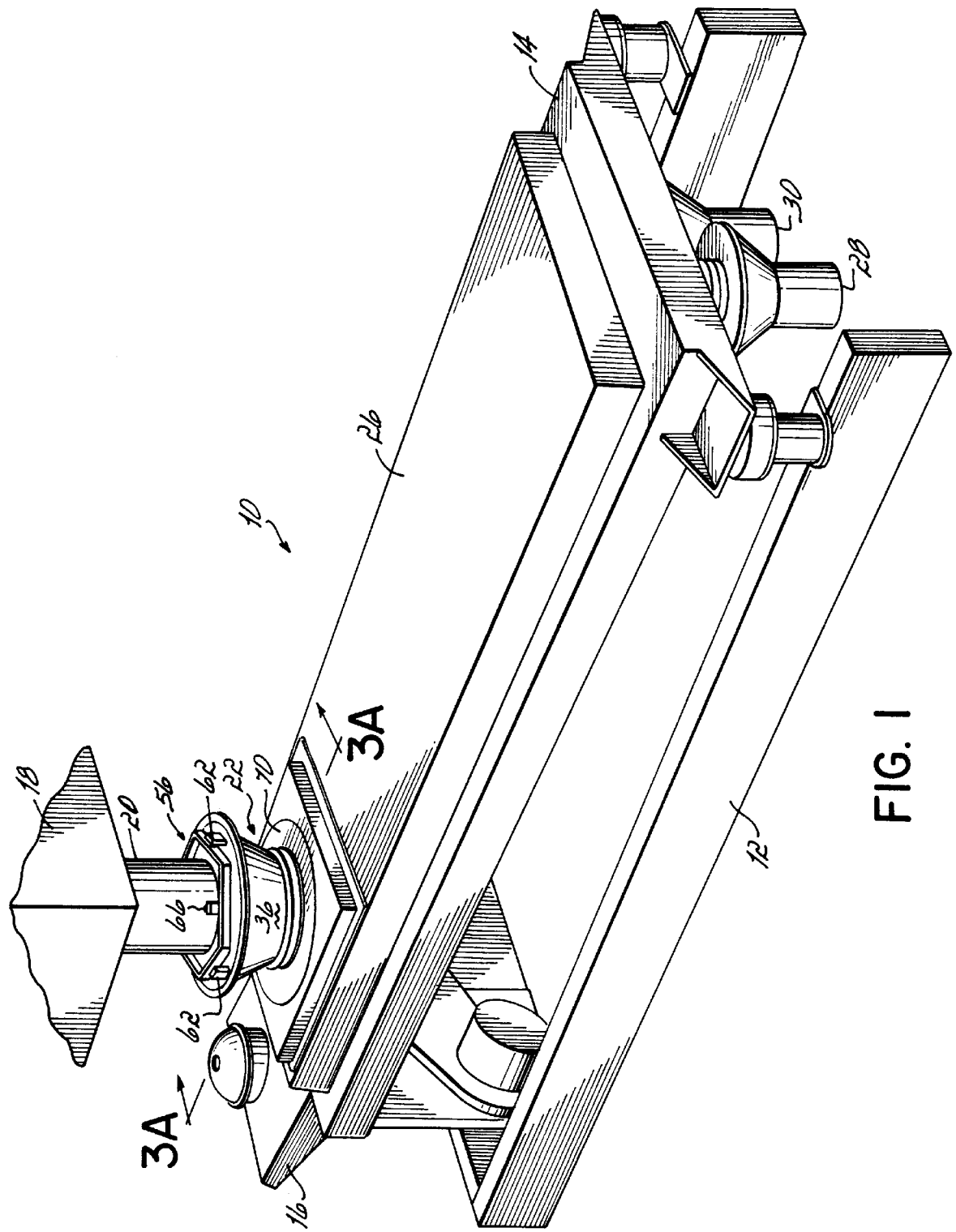
FIG. 1 is a perspective view of a screening machine fitted with a gimble supported coupling in accordance with a preferred embodiment of this invention.

For purposes of explanation, FIG. 1 illustrates a preferred form of the invention as used with a gyratory screening machine of the ROTEX® type, but it should be understood that the invention is not limited to use with machines of that type or, indeed, to use with screening machines. The machine designated generally by 10 includes a base or floor mount 12 on which a downwardly tilted screen deck or box 14 is movably supported. A drive 16 generates a screening motion, for example a gyratory screening motion, which is applied to the head end of box 14. In the case of a ROTEX machine, the screening movement of the box is substantially orbital at the head end and nearly linear at the foot end, and also includes a small vertical component of motion.

Particulate material to be screened is fed as a stream from a supply hopper 18 through a feed spout or pipe 20 (which can be more broadly referred to as the upstream opening because it is upstream of the coupling), from which the stream falls through a coupling generally designated by 22 in accordance with a preferred embodiment of the invention, and into screen box 14 through an opening 24 (see FIG. 3A) in the screen box top cover 26. (opening 24 can be more broadly referred to as the down-stream opening.) The top cover 26 is clamped to and moves with screen box 14 in the screening movement. Box 14 mounts at least one, and usually a stack of screens (not shown). Oversize particles, that is, particles which do not pass through the top screen, are discharged off the lower end of the top screen into an "overs" outlet or conduit 28 at the lower end of the screen. Smaller size particles which pass through one or more screens are discharged through one or more fines outlets 30. In this application feed spout 20 and the outlets 28 and 30 are fixed and do not move with the screen box.

Figure 2:
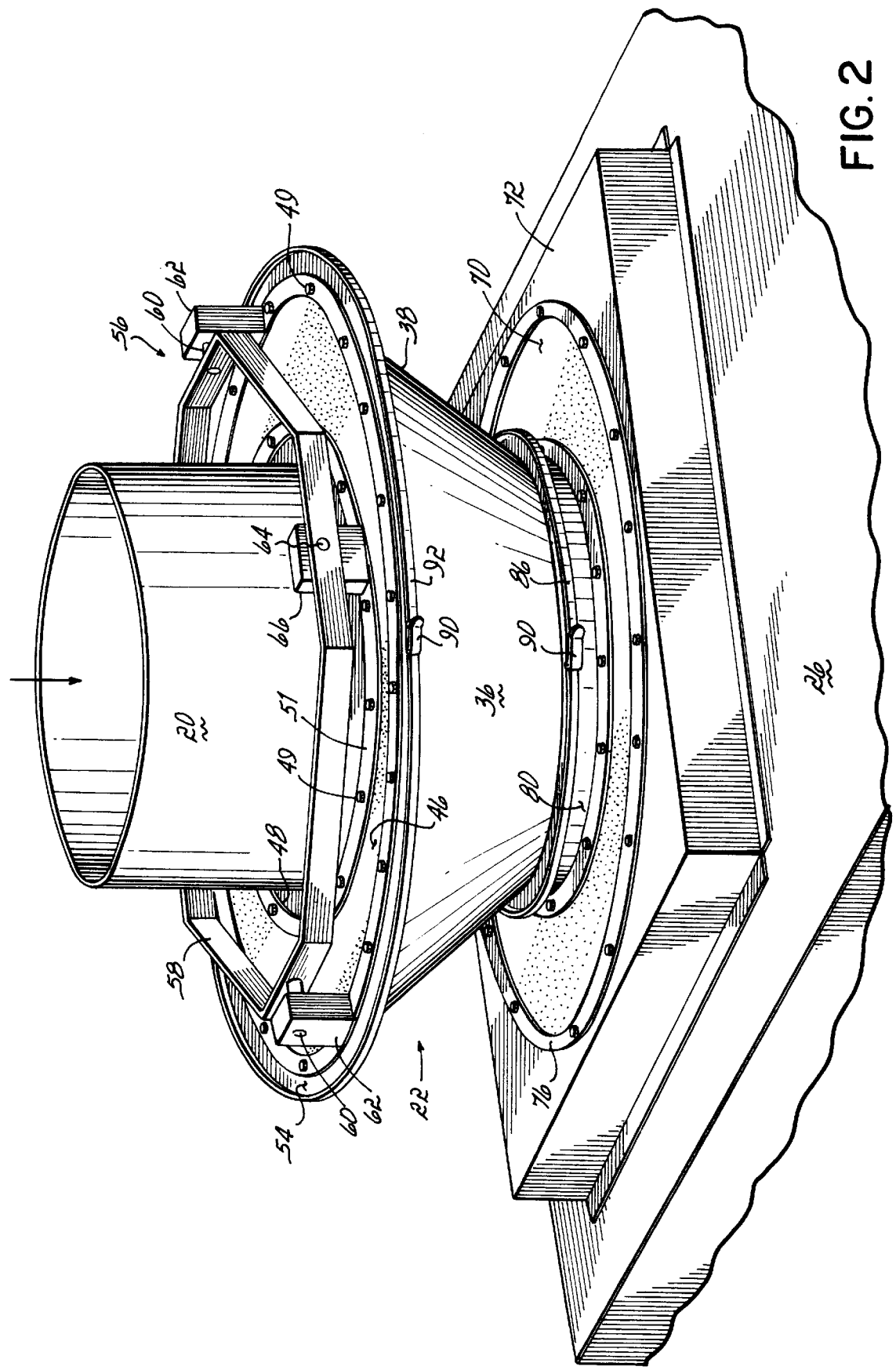
FIG. 2 is an enlarged perspective view, partly broken away, of the gimble supported coupling shown in FIG. 1.
Figure 3B:
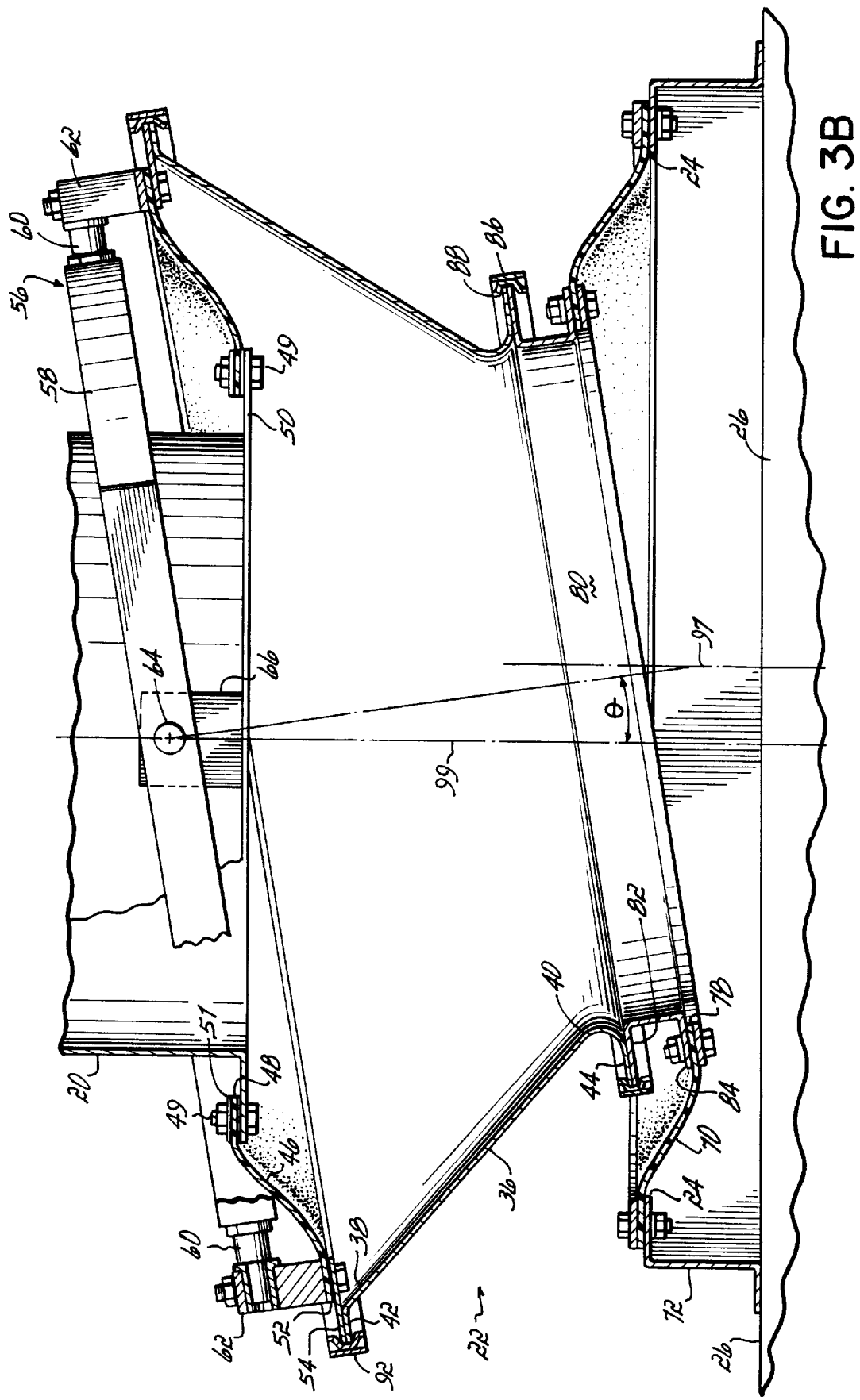
FIG. 3B is an enlarged section similar to FIG. 3A but shows how the diaphragms deflect to accommodate disalignment of the top cover opening with respect to the feed spout, as occurs in operation.

The gimble-supported coupling 22 is shown in more detail in FIGS. 2, 3A and 3B. The coupling includes a funnel or cone 36 which tapers inwardly in the downward direction. It should be noted that the inside diameter of the mouth of the cone, at its upper end 38, is substantially wider than the diameter of feed spout 20, whereas the discharge end or throat 40 of funnel 36 is preferably substantially narrower than top cover opening 24. The funnel mouth 38 effectively surrounds feed spout 20; and top cover opening 24 effectively surrounds the funnel throat 40. Funnel 36 may be formed of a rigid plastic material such as polyurethane or may be spun in sheet metal such as aluminum or stainless steel. The funnel has an outwardly projecting upper mounting flange 42 around its mouth 38, and a lower mounting flange 44 outwardly adjacent its throat 40.

An upper flexible diaphragm 46 is connected to and provides a seal between funnel upper mounting flange 42 and feed spout 20, so that the feed spout is sealed within the entrance to the funnel. Diaphragm 46 is preferably an elastomeric sheet material such as neoprene or natural rubber and is preferably annular or donut shaped in plan, having an opening 48 at its center which is secured and sealed around feed spout 20. The diaphragm may have one or more circumferential annular corrugations or pleats as shown FIG. 3A by phantom line 98, and in FIG. 5, for greater flexibility. For convenience of mounting the diaphragm to the pipe 20 it is preferred to provide an outwardly projecting annular flange 50 around the lower end of the spout. The opening 48 in upper diaphragm 46 may be secured to flange 50 by bolts 49 which pass through annular bearing strips 51, as shown. The outer peripheral portion 52 of upper diaphragm 46 preferably is bolted or otherwise secured to an annular mounting ring 54, against which the upper mounting flange 42 of funnel 36 is seated, as described below.

In the preferred embodiment, the weight of coupling 22 is carried by a gimble mounting indicated generally by 56. The mount includes a gimble ring 58 which for ease of assembly may be in the form of an octagon (see FIG. 2), positioned above upper diaphragm 46. At two diametrically opposite points rotational bearings 60, 60 are mounted to and project outwardly from ring 58 and are pivotally journaled in bearing supports 62, 62, respectively, which are secured on diaphragm mounting ring 54 (see FIG. 3A). The two bearings 60, 60 permit ring 58 to be tilted about an axis 59 between their centers. At positions spaced 90 degrees from the axis of bearings 60, 60, two other bearings 64, 64 project inwardly from ring 58, and are pivotally received in inside bearing supports, one of which is designated at 66. The inside bearing supports 66 are secured to mounting flange 50 around spout 20. Together, the orthogonally positioned bearings 60, 60, 64, 64 of gimble 56 transfer the weight of coupling 22 to feed spout 20 while still permitting the coupling to tilt or nutate with respect to the axis of the spout. (Such tilt is designated by Θ in FIG. 3B.)

The throat or discharge end 40 of funnel 36 is sealed within a center aperture of a second or lower diaphragm 70, and the outer peripheral portion 76 of diaphragm 70 is sealed over screen box top cover entrance 24. The two diaphragms 46 and 70 may be generally similar, and both may have annular corrugations for greater flexibility. However, it should be noted that, with respect to funnel 36, the lower diaphragm is positioned reversely from the upper diaphragm: funnel mouth 38 surrounds the upper diaphragm whereas funnel throat 40 is surrounded by the lower diaphragm 70 which projects outwardly around it. This "inside/outside" diaphragm positioning prevents both diaphragms from being exposed to the falling particle stream.

Lower diaphragm 70 may be mounted directly on top cover 26; or, for ease of retrofitting to the top cover of an existing machine, the opening 24 may be provided in a coupling mount box 72 that is secured over a pre-existing opening 74 to the screen box (see FIG. 3A). The coupling box opening 24, which is substantially coaxial with top cover opening 74 and the outer peripheral portion 76 of lower diaphragm 70, is secured as by clamp rings and bolts to the top panel of the mount box. The inner peripheral portion 78 of lower diaphragm 70 is sealed around the throat 40 of funnel 36.

The diaphragms may in principle be permanently connected to the funnel mounting flanges 42 and 44, but in order to facilitate assembly and change it is preferred to use quick release or disconnect clamps to connect them. One form of quick disconnect clamp structure for connecting the diaphragms to funnel 36 is shown in FIGS. 2, 3A and B. A hoop 80 is positioned directly below the funnel throat 40 and has an inside diameter approximating that of the throat, with outwardly projecting vertically spaced annular flanges 82 and 84. Flange 84 is secured on the inner peripheral portion 78 of lower diaphragm 70, around the diaphragm opening. Top flange 82 of hoop 80 is facially engaged against the funnel lower mounting flange 44, and both are held tightly together in axial alignment by a spring ring 86, i.e., an expansible, circular ring. Ring 86 has an inwardly facing V-shaped channel 88 which is sized to cam and hold the two facially engaging flanges 44 and 82 in alignment and against one another. The circumference of spring ring 86 is discontinuous or split, and a toggle or overcenter clamp 90 (see FIG. 2) is provided by which the ends can be pulled together so that the ring tightly encircles the two flanges 44 and 82 and holds them rigidly clamped in its V-groove 88. A similar spring ring 92 is preferably used to clamp the upper funnel mounting flange 42 to diaphragm mounting ring 54. It will be seen that by loosening (unclamping) the two spring rings 86, 92, the funnel can readily be released from the upper and lower diaphragms 46, 70.

FIG. 3B illustrates how the upper and lower diaphragms 46, 70 of this invention accommodate movement of the cover with respect to the feed spout 20, yet at the same time are shielded by the funnel 36 from exposure to abrasion by falling particles. More specifically, operation of the screener moves the axis 97 of top cover opening 24 in a circular or slightly elliptical orbit around the axis 99 of feed spout 20. Both diaphragms deflect to accommodate this movement. When the cyclical orbital travel of top cover opening 24 shifts it to the right of the axis 99 of the feed spout 20, as seen in FIG. 3B. The funnel moves in a nutating motion in which one side of the upper diaphragm 46 (illustrated as the left side in FIG. 3B) is deflected downwardly while the other side of that diaphragm is deflected upwardly. The left side of the lower diaphragm 70 is deflected downwardly from the funnel throat, while the right side of that diaphragm is deflected upwardly. The gimble ring 56 tilts to accommodate the movement as the angle of deflection Θ describes a cone around the spout 20.

Especially if the weight of the coupling is carried by a gimble, the diaphragms are not under substantial radial tension. This enables them to accommodate deflection with minimal fatigue and wear. The falling particle stream does not impinge on upper diaphragm 46 because that diaphragm lies outside of the feed spout and out of the path of the falling particles; and the particles do not impinge on the lower diaphragm because that diaphragm extends outwardly of the lower end of the funnel, and hence is also out of the particle stream. Tests have shown that this arrangement provides a substantial improvement in life of the coupling, as compared to a flexible corrugated connector of the type shown in U.S. Pat. No. 2,047,713, previously discussed.

Figure 4:
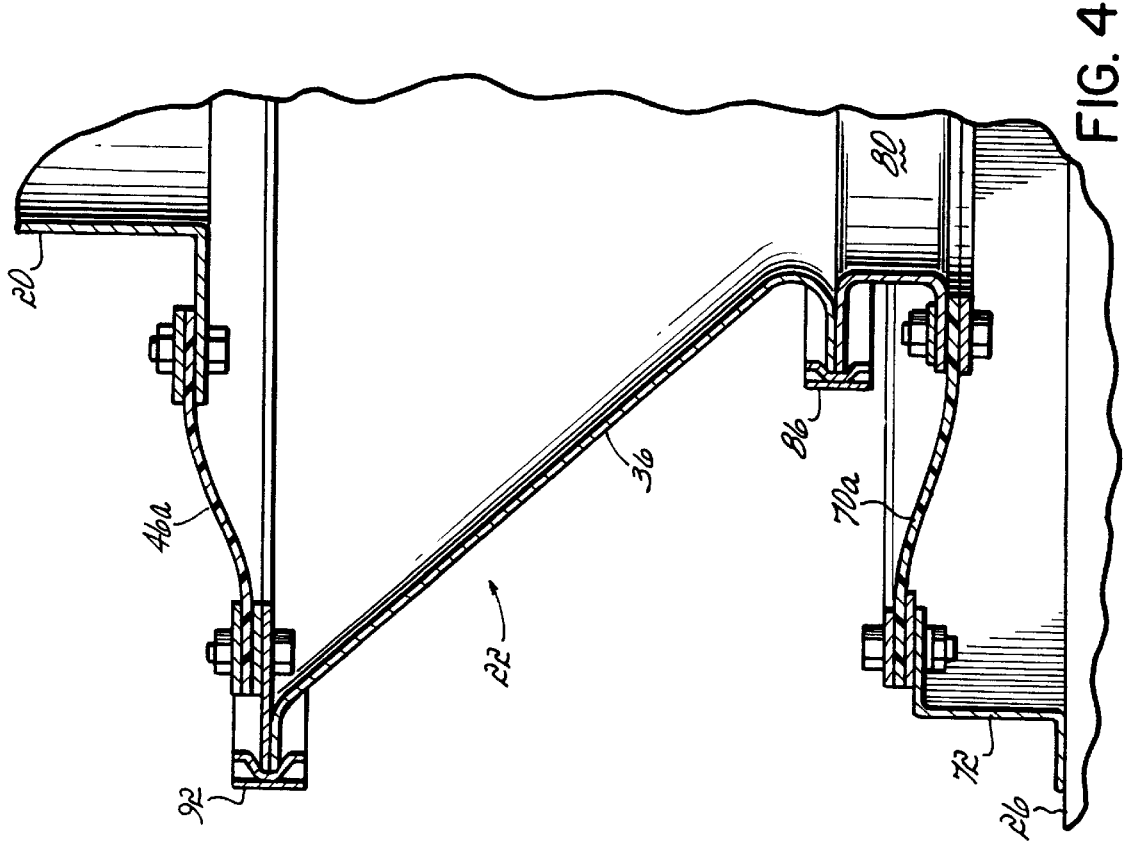
FIG. 4 shows a coupling in accordance with an alternative embodiment of the invention wherein the diaphragms carry the weight of the coupling, without a gimble support.

In the embodiments described above the gimble 56 carries the weight of the coupling. In the case of a large screening machine, the coupling may weigh 50 pounds or more, and the provision of the gimble permits the use of diaphragms which are at once thinner and hence more flexible, less expensive, and under less radial tension. However, in the case of a smaller machine in which the coupling weight is small, it may be practical for the diaphragms 46a, 70a, themselves to carry the weight of the coupling, without a gimble. Such an arrangement is shown in FIG. 4. As can be seen, the upper diaphragm 46a and the lower diaphragm 70a sag downwardly because they are placed under some radial tension by the weight of the funnel 36. The diaphragms 46a, 70a, may be thicker to better withstand the weight of the coupling.

Figure 5:
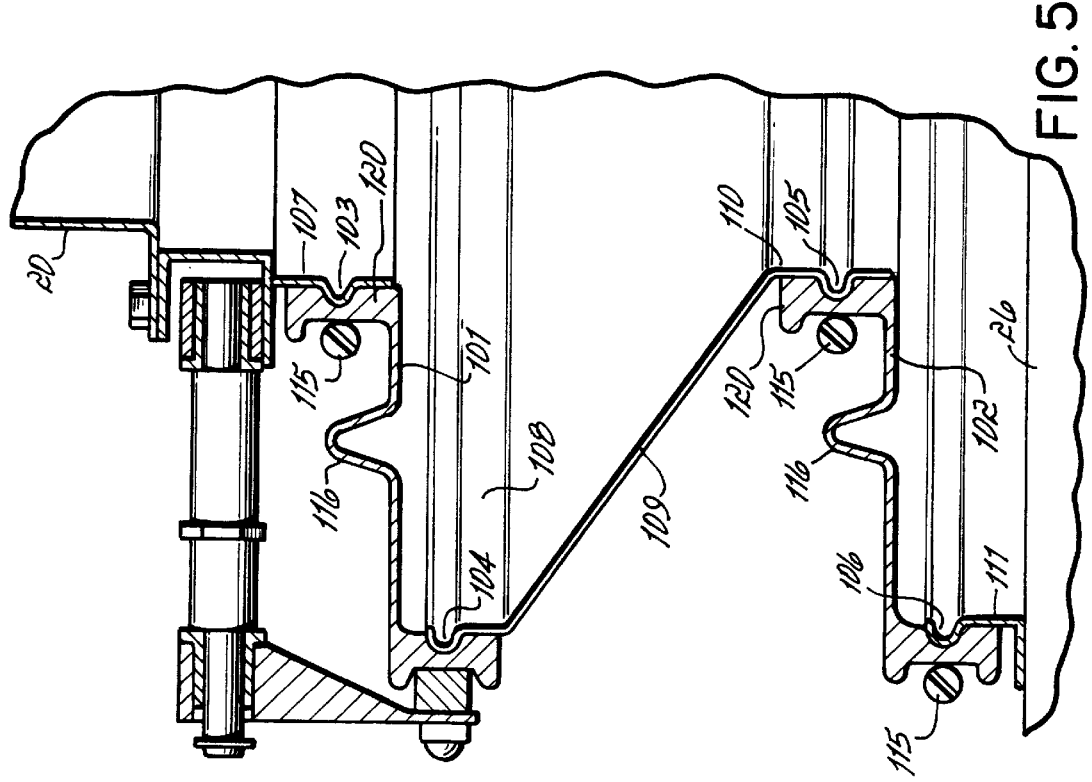
FIG. 5 is an axial section of a coupling in accordance with a modified embodiment of the invention.

FIG. 5 shows an alternative form of diaphragm for use with the funnel. Rather than being cut from sheet material, the upper and lower diaphragms 101, 102 are molded of a flexible material and are snapped over circumferential mounting beads adjacent both at the inside and the outside of each diaphragm. Specifically, an inner bead 103 is formed around a sleeve 107 secured to feed pipe 20; an outer bead 104 is formed around the outside of the upper end or mouth 108 of the funnel 109; a bead 105 is formed around the outside of the throat of a spun metal funnel 110; and a bead 106 encircles the outside of the opening 111 to the screen box 26. Each diaphragm 101 and 102 has an integrally molded inner sleeve 120 in the form of a ring which snaps over and tightly encircles the inner bead 103 or 105, and an integrally molded outer sleeve in the form of a ring which snaps over and encircles the outside bead 104 or 106. The diaphragm sleeves may be further secured by a screw operated flexible band or hose clamp 115 or the like. As can be seen, diaphragms 101, 102 can be identical and can be mounted at either the mouth or the throat of the funnel. They are easily installed and removed. As shown, each diaphragm has an annular "corrugation" 116 which improves its flexibility in use. The diaphragms are shown as mounted to a gimbal-supported coupling, but can alternatively be used without a gimbal.

As described above and shown in the drawings, the invention is especially suitable for use at the inlet opening of a screening machine. However, it should be understood that the invention is not limited solely to that use and that it can be used in other applications wherein there is relative movement between an upstream opening and a downstream opening, as where one is fixed and the other is moving, for example between the outlet of a screen box and a fixed discharge pipe. The coupling will accommodate relative motion between them. More broadly, the invention can be used between two openings in conduits or pipes, vertical or horizontal, even in the absence of relative motion between them, as where one is disaligned or cocked with respect to the other.

Having described the invention, what is claimed is:

1. A coupling for directing a stream of particles falling into or from the screen box of a screening machine while said machine is operating, said coupling comprising, a funnel having a mouth for receiving a particle stream from an upstream opening, said funnel having a discharge opening smaller than its said mouth, an upper diaphragm having an aperture sealable outwardly around said upstream opening and an outer peripheral portion which is sealable to said funnel at said funnel mouth, and a lower diaphragm, said lower diaphragm having an aperture sealable around said funnel discharge opening and an outer peripheral portion which is sealable to a downstream opening so that particles from said upstream opening will pass through said upper diaphragm and will be directed by said funnel through said lower diaphragm and into said downstream opening, said diaphragms being flexible and permitting said funnel to tilt axially to accommodate screening motion of said screen box.

2. The coupling of claim 1 wherein said aperture of said upper diaphragm is sealable to a fixed feed spout and said outer peripheral portion of said lower diaphragm is sealable to an opening in the top cover of the screen box of a screening machine.

3. The coupling of claim 1 further including a gimble mountable to a support structure, said funnel being suspended from said gimble, said gimble adapted to permit said funnel to tilt axially with respect to said support structure.

4. The coupling of claim 3 wherein said gimble includes a ring mounted to pivot between said feed spout and said funnel.

5. The coupling of claim 1 wherein said funnel mouth is wider than said upstream opening.

6. The coupling of claim 5 wherein the said funnel discharge opening is smaller than said downstream opening.

7. The coupling of claim 1, further including a gimble for supporting at least some of the weight of said coupling, said gimble adapted to tiltably support said funnel from a fixed support.

8. The coupling of claim 1 wherein said diaphragms are annular.

9. The coupling of claim 1 wherein at least one of said diaphragms includes at least one corrugation.

10. The coupling of claim 1 further wherein said outer peripheral portion of said upper diaphragm is mountable to said funnel by a releasable connector.

11. The coupling of claim 10 wherein said releasable connector is a band clamp.

12. The coupling of claim 1 further wherein said outer peripheral portion of said lower diaphragm is mounted to said downstream opening by a releasable connector.

13. The coupling of claim 12 wherein said releasable connector is a band clamp.

14. The coupling of claim 1 wherein the weight of said funnel is transferred through said diaphragms to at least one of said upstream and downstream openings.

15. The coupling of claim 1 wherein at least one of said diaphragms has an inner snap ring around said aperture and an outer snap ring around an outer peripheral portion of said diaphragm.

16. A coupling for directing a stream of particles moving from an upstream opening into a downstream opening which openings are moving or disaligned with respect to one another, said coupling comprising, a funnel having a mouth for receiving said stream, said mouth being larger than said upstream opening, an upstream diaphragm with an aperture which is mountable around said upstream opening, said upstream diaphragm having an outer peripheral portion which is mounted to said funnel adjacent said funnel mouth, and a downstream diaphragm having an aperture mounted around a discharge end of said funnel and having an outer peripheral portion which is mountable around said downstream opening, whereby said stream is directed by said funnel into said downstream opening, said diaphragms being flexible and permitting said funnel to tilt to accommodate disalignment or motion of said upstream and downstream openings with respect to one another.

* * * * *